US012426059B2

(12) United States Patent
Chaudhuri

(10) Patent No.: US 12,426,059 B2
(45) Date of Patent: Sep. 23, 2025

(54) METHOD AND SYSTEM OF IMPROVED RESOURCE ALLOCATION IN WIRELESS COMMUNICATION NETWORK

(71) Applicant: Radisys India Private Limited, Bangalore (IN)

(72) Inventor: Saptarshi Chaudhuri, Bengaluru (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/246,694

(22) PCT Filed: Dec. 26, 2022

(86) PCT No.: PCT/IB2022/062786
§ 371 (c)(1),
(2) Date: Mar. 27, 2023

(87) PCT Pub. No.: WO2023/126818
PCT Pub. Date: Jul. 6, 2023

(65) Prior Publication Data
US 2024/0365323 A1    Oct. 31, 2024

(30) Foreign Application Priority Data
Dec. 29, 2021   (IN) .............................. 202141061562

(51) Int. Cl.
*H04W 72/23*      (2023.01)
*H04W 72/04*      (2023.01)
*H04W 72/542*     (2023.01)

(52) U.S. Cl.
CPC ........... *H04W 72/23* (2023.01); *H04W 72/04* (2013.01); *H04W 72/542* (2023.01)

(58) Field of Classification Search
CPC ..... H04W 72/23; H04W 72/20; H04W 72/04; H04W 72/12; H04W 72/1273;
(Continued)

(56) References Cited

U.S. PATENT DOCUMENTS 10,757,581 B2 *   8/2020   Hwang ................ H04L 5/0053
11,219,004 B2     1/2022   Hwang et al.
(Continued)

FOREIGN PATENT DOCUMENTS

CN    103368716 A    10/2013
EP      2934047 A1   10/2015
(Continued)

OTHER PUBLICATIONS

International Search Report and Written Opinion issued by the International Searching Authority issued in related Foreign Application No. PCT/IB202/062786, mailed Apr. 11, 2023 (7 pages).
(Continued)

*Primary Examiner* — Olumide Ajibade Akonai
(74) *Attorney, Agent, or Firm* — FINNEGAN, HENDERSON, FARABOW, GARRETT & DUNNER LLP

(57) ABSTRACT

The present invention provides a method and system for improved Physical-layer processing for Physical uplink control channel (PDCCH) resource allocation mechanism for high speed wireless communication network. The method includes estimation of PDCCH resources with the default resource configuration; able to calculate the operational parameters dynamically; calculates the PDCCH candidates using the self-generated operation parameters; configure the system with the PDCCH resources to make it operational; and able to correct the estimation values of the PDCCH candidates using the feedback. Detailed methods for each of the above steps are also disclosed.

20 Claims, 11 Drawing Sheets

(58) Field of Classification Search
CPC . H04W 72/542; H04W 72/11; H04W 72/569; H04W 72/044; H04W 72/02; H04L 5/0051
See application file for complete search history.

(56) References Cited

U.S. PATENT DOCUMENTS

| | | | |
|---|---|---|---|
| 12,095,697 B2* | 9/2024 | Tiirola | H04L 5/0053 |
| 2011/0207498 A1 | 8/2011 | Wang et al. | |
| 2020/0267698 A1 | 8/2020 | Xing et al. | |
| 2021/0160879 A1 | 5/2021 | Lin et al. | |
| 2021/0258924 A1* | 8/2021 | Jose | H04W 72/52 |

FOREIGN PATENT DOCUMENTS

| | | |
|---|---|---|
| EP | 3678433 A1 | 7/2020 |
| RU | 2763149 C1 | 12/2021 |
| WO | 2021101207 A1 | 5/2021 |

OTHER PUBLICATIONS

3GPP TSG-RAN WG1 #92bis, R1-1805509, Sanya, China, Apr. 16-20, 2018, Agenda Item: 7.1.3.2.4; Source: Nokia, Nokia Shanghai Bell; Title: "Remaining open items on PUCCH resources allocation"; Document for: Discussion and Decision (9 pgs.).

* cited by examiner

```
PDCCH-Config ::= SEQUENCE {
    controlResourceSetToAddModList   SEQUENCE(SIZE (1..3)) OF ControlResourceSet   OPTIONAL, -- Need N
    controlResourceSetToReleaseList  SEQUENCE(SIZE (1..3)) OF ControlResourceSetId OPTIONAL, -- Need N
    searchSpacesToAddModList         SEQUENCE(SIZE (1..10)) OF SearchSpace         OPTIONAL, -- Need N
    searchSpacesToReleaseList        SEQUENCE(SIZE (1..10)) OF SearchSpaceId       OPTIONAL, -- Need N
    downlinkPreemption               SetupRelease { DownlinkPreemption }           OPTIONAL, -- Need M
    tpc-PUSCH                        SetupRelease { PUSCH-TPC-CommandConfig }      OPTIONAL, -- Need M
    tpc-PUCCH                        SetupRelease { PUCCH-TPC-CommandConfig }      OPTIONAL, -- Cond PUCCH-CellOnly
    tpc-SRS                          SetupRelease { SRS-TPC-CommandConfig }        OPTIONAL, -- Need M
    ...
}
```

FIG. 3

24 RBS TWO OFDM SYMBOLS ARE CONFIGURED IN A CORESET - NON INTERLEAVING

| RB | SYM1 | SYM2 | SYM1 | SYM2 | SYM1 | SYM2 | SYM1 | SYM2 |
|---|---|---|---|---|---|---|---|---|
| 24 | 8 | 8 | 4 | 4 | 2 | 2 | 1 | 1 |
| 23 | 8 | 8 | 4 | 4 | 2 | 2 | 1 | 1 |
| 22 | 8 | 8 | 4 | 4 | 2 | 2 | 1 | 1 |
| 21 | 7 | 7 | 4 | 4 | 2 | 2 | 1 | 1 |
| 20 | 7 | 7 | 4 | 4 | 2 | 2 | 1 | 1 |
| 19 | 7 | 7 | 4 | 4 | 2 | 2 | 1 | 1 |
| 18 | 6 | 6 | 3 | 3 | 2 | 2 | 1 | 1 |
| 17 | 6 | 6 | 3 | 3 | 2 | 2 | 1 | 1 |
| 16 | 6 | 6 | 3 | 3 | 2 | 2 | 1 | 1 |
| 15 | 5 | 5 | 3 | 3 | 2 | 2 | 1 | 1 |
| 14 | 5 | 5 | 3 | 3 | 2 | 2 | 1 | 1 |
| 13 | 5 | 5 | 3 | 3 | 2 | 2 | 1 | 1 |
| 12 | 4 | 4 | 2 | 2 | 1 | 1 | 1 | 1 |
| 11 | 4 | 4 | 2 | 2 | 1 | 1 | 1 | 1 |
| 10 | 4 | 4 | 2 | 2 | 1 | 1 | 1 | 1 |
| 9 | 3 | 3 | 2 | 2 | 1 | 1 | 1 | 1 |
| 8 | 3 | 3 | 2 | 2 | 1 | 1 | 1 | 1 |
| 7 | 3 | 3 | 2 | 2 | 1 | 1 | 1 | 1 |
| 6 | 2 | 2 | 1 | 1 | 1 | 1 | 1 | 1 |
| 5 | 2 | 2 | 1 | 1 | 1 | 1 | 1 | 1 |
| 4 | 2 | 2 | 1 | 1 | 1 | 1 | 1 | 1 |
| 3 | 1 | 1 | 1 | 1 | 1 | 1 | 1 | 1 |
| 2 | 1 | 1 | 1 | 1 | 1 | 1 | 1 | 1 |
| 1 | 1 | 1 | 1 | 1 | 1 | 1 | 1 | 1 |
| | AGGREGATION LEVEL 1 CANDIDATES FOR BLIND DECODING | | AGGREGATION LEVEL 2 CANDIDATES FOR BLIND DECODING | | AGGREGATION LEVEL 4 CANDIDATES FOR BLIND DECODING | | AGGREGATION LEVEL 8 CANDIDATES FOR BLIND DECODING | |

*FIG. 4A*

24 RBS TWO OFDM SYMBOLS ARE CONFIGURED IN A CORESET - INTERLEAVING

| RB | SYM1 | SYM2 | SYM1 | SYM2 | SYM1 | SYM2 | SYM1 | SYM2 |
|----|------|------|------|------|------|------|------|------|
| 24 | 8 | 8 | 4 | 4 | 2 | 2 | 1 | 1 |
| 23 | 7 | 7 | 3 | 3 | 1 | 1 | 1 | 1 |
| 22 | 6 | 6 | 2 | 2 | 2 | 2 | 1 | 1 |
| 21 | 5 | 5 | 1 | 1 | 1 | 1 | 1 | 1 |
| 20 | 4 | 4 | 4 | 4 | 2 | 2 | 1 | 1 |
| 19 | 3 | 3 | 3 | 3 | 1 | 1 | 1 | 1 |
| 18 | 2 | 2 | 2 | 2 | 2 | 2 | 1 | 1 |
| 17 | 1 | 1 | 1 | 1 | 1 | 1 | 1 | 1 |
| 16 | 8 | 8 | 4 | 4 | 2 | 2 | 1 | 1 |
| 15 | 7 | 7 | 3 | 3 | 1 | 1 | 1 | 1 |
| 14 | 6 | 6 | 2 | 2 | 2 | 2 | 1 | 1 |
| 13 | 5 | 5 | 1 | 1 | 1 | 1 | 1 | 1 |
| 12 | 4 | 4 | 4 | 4 | 2 | 2 | 1 | 1 |
| 11 | 3 | 3 | 3 | 3 | 1 | 1 | 1 | 1 |
| 10 | 2 | 2 | 2 | 2 | 2 | 2 | 1 | 1 |
| 9 | 1 | 1 | 1 | 1 | 1 | 1 | 1 | 1 |
| 8 | 8 | 8 | 4 | 4 | 2 | 2 | 1 | 1 |
| 7 | 7 | 7 | 3 | 3 | 1 | 1 | 1 | 1 |
| 6 | 6 | 6 | 2 | 2 | 2 | 2 | 1 | 1 |
| 5 | 5 | 5 | 1 | 1 | 1 | 1 | 1 | 1 |
| 4 | 4 | 4 | 4 | 4 | 2 | 2 | 1 | 1 |
| 3 | 3 | 3 | 3 | 3 | 1 | 1 | 1 | 1 |
| 2 | 2 | 2 | 2 | 2 | 2 | 2 | 1 | 1 |
| 1 | 1 | 1 | 1 | 1 | 1 | 1 | 1 | 1 |
| | AGGREGATION LEVEL 1 CANDIDATES FOR BLIND DECODING | | AGGREGATION LEVEL 2 CANDIDATES FOR BLIND DECODING | | AGGREGATION LEVEL 4 CANDIDATES FOR BLIND DECODING | | AGGREGATION LEVEL 8 CANDIDATES FOR BLIND DECODING | |

*FIG. 4B*

METHOD AND SYSTEM OF IMPROVED RESOURCE ALLOCATION IN WIRELESS COMMUNICATION NETWORK

FIELD OF INVENTION

The embodiments of the present disclosure generally relate to communications networks. More particularly, the present disclosure relates to improved resource allocation mechanism for high speed wireless communication network.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The fifth generation (5G) technology is expected to fundamentally transform the role that telecommunications technology plays in the industry and society at large. Thus, 5G wireless communication system is expected to support a broad range of newly emerging applications on top of the regular cellular mobile broadband services. These applications or the services that would be supported can be categorized into enhanced mobile broadband, massive deployment of internet of things device and ultra-reliable low latency communication. Using these services, users could do video conference, television broadcast, and video on-demand (simultaneous streaming) applications using different types of multimedia services over internet, high speed browsing, voice call, gaming, connected car communications and the like. To order to support the above applications and services, provides a 3GPP specification that proposes a network deployment architecture as summarized in FIG. 1.

In order to transmit a Physical-layer processing for Physical control channel (PDCCH) and Physical-layer processing for Physical shared channel (PDSCH) information using the CCEs in the downlink direction, a prior art uses a bandwidth part (BWP) method. The BWP enables more flexibility in how CCE resources are assigned in each carrier. The BWP enables multiplexing of different information of PDCCH and PDSCH, thus enabling better utilization and adaptation of operator spectrum and UE's battery consumption. 5G NR's maximum carrier bandwidth is up to 100 MHz in frequency range 1 (FR1: 450 MHz to 6 GHZ), or up to 400 MHZ in frequency range 2 (FR2: 24.25 GHZ to 52.6 GHz) that can be aggregated with a maximum bandwidth of 800 MHZ.

As per another prior art, for a gNB system, there could be multiple candidates defined for the each of the aggregation levels. Thus, using the multiple candidates per aggregation levels and for getting the number of CCEs per aggregation level, the gNB system calculates the total number of CCEs requirement. This total number of CCEs shall be finally used for the Control Resource Set (CORESET) calculation. Hence, the CORESET comprises of multiples REGs in frequency domain and '1 or 2 or 3' OFDM symbols in time domain. Thus, each of the BWP shall have its own CORESET definition in order to schedule the users in that individualistic BWP. One such example of showing the relationship of the BWP, CORESET, Aggregation Level and the CCEs are given in FIGS. 2A and 2B, 4A and 4B. FIGS. 2A and 2B show exemplary representations of a Non overlapping BWP Schema and an Overlapping BWP Schema respectively. As seen from FIGS. 2A and 2B, there are three non-overlapping BWP (i.e. BWP1, 2, 3) got created and each of the BWP is having three such CORESET (i.e. CORESET 1,2,3). Each of these BWPs and CORESET configuration could be configured to UEs using RRC signaling. The information element that carries the CORESET and search space configuration is given in FIG. 3. The search space parameter of FIG. 3 gets further defined with respect to (a) monitoring Slot Periodicity And Offset (b) nr of Candidates (c) search Space Type and the like mentioned in a prior art. One of the main entities of the search space design is the nr of Candidates parameter which defines the number of candidates associated for one specific aggregation levels. Depending on the number of candidates per aggregation levels, the CCEs numbers are also derived accordingly. For example, if two candidates for aggregation level 2, then the total number of CCEs required for the system would be 4. More detailed level calculation is shown in FIGS. 4A and 4B. As seen in FIG. 4A, eight candidates of Aggregation Level-1, four candidates of Aggregation Level-2, two candidates of Aggregation Level-4, one candidate of Aggregation Level-8, and ZERO candidate of Aggregation Level-16 are seen. The above explanation translates to the fact, that there will be definite amount of CCEs whenever we are configuring the number of candidates per aggregation levels. As stated earlier, from the candidates of aggregation level, the number of CCEs could be determined which in turn defines the final CORESET parameter definition. In FIG. 4B, an interleaving pattern of distribution of the CCEs both in frequency and time domain. However, the 3GPP specification fails to provide mechanism to identify relevant candidates for each aggregation level based on service and content for effective radio resource usage with respect to the control channel elements (CCE).

One prior art again proposes a method of constructing a subframe of control channel elements for PDCCH transmission based on the evaluation of a cost function C(j) for each valid combination (j) of the control channel elements which improves the performance of the system. It comprises of predetermined distribution of a total number of transmitted resource elements, total used transmission power, and predetermined distribution of interference per symbol. But the prior-art fails to provide the dynamic distribution of the total number of transmitted resource elements with respect to the system variables like channel conditions or the total connected users. The predetermined option will only take care of some specific condition of the system deployment to any of the wireless operator.

Another prior art proposes a method of allocating control channel resources at a transmitter where these control resources are allocated to multiple scheduling entities in using the availability states of the control channel elements such as unused, available, unavailable, and contended. The resource mapping circuit of the system is configured to determine an availability state of each candidate set by: (a) determining that a candidate set is available when the allocation state of all control channel elements is unused; (b) determining that a candidate set is unavailable when the allocation state of at least one of its control channel elements is used; (c) determining that a candidate set is contended when the allocation state of one or more of its control channel elements is alternate and the allocation state of the remaining control channel elements is unused, and allocating the control channel elements in alternate state doesn't block other competing scheduling entities for which one or more of the control channel elements within the candidate set are designated as alternate.

But the prior-art fails to take into consideration that how many such control channel elements shall be associated to a user based on the user's mobility, channel conditions and user traffic data queued in the system. One more prior art describes a new structure of a control channel region within a sub-frame of a 3GPP-based based communication system using OFDM in the downlink. The control channel region is divided in CCEs that have equal size irrespective of the presence of further cell-specific and/or User-specific reference signals within the control channel region. The method constitutes of taking multiple CCEs from the region defined for PDSCH region, assigning it to multiple devices, determining CRC code for the downlink control information for the receiving devices. But the prior-art fails to take into consideration that the how many such control channel elements shall be associated to cell-specific and/or UE-specific reference signals. Also, it does not take into consideration of the quantification of these CCEs to user's specific reference signals. Due to that, if the user is into bad channel condition, it does not take into consideration of how many such CCEs to be allocated or how such CCEs needs to be shared among multiple user devices. A wireless communication control channel apparatus and method provides for control channel transmission in a wireless network. As per the method, the at least one resource block (RB) including a first control channel element get associated with a first antenna port (AP) and a second control channel element get associated with a second AP. The first and second control channel elements might be used for transmission for a single control channel, and a first reference signal sequence associated with one of the first AP and the second AP is selected for transmission of the single control channel based on a control channel element index value. The prior-art does not provide the methods of associating the upper bound of the RBs to be associated with the control channel element. Due to this, there will be conditions where the user devices could get less control channel elements for certain control channel messages. Also, from the system perspective there is no defined method of limiting the RBs to the control channel elements. This will lead to under or over utilization of RBs to the control channel elements. A Control Channel Element Indexing Scheme mentions about partitioning the control channel resources based on indexing scheme. The system understands the data channel information which is partitioned, the channel resource elements get partitioned and then partitioned elements get associated with the partitioned control resource elements and that way the data channel information get transmitted to apparatus through into multiple partitions. The method also creates a unique indexing pair of partitioned elements and partitioned control resource elements. The method also comprises of obtains information of which resource blocks carries a downlink control channel, determines several control channel elements per allocated resource block and then defines at least one control channel elements index based on the information regarding which resource block carries a downlink control channel. However, the scheme not provide how many of CCE index could be generated in the system based on the multiple system variables like users in the network, interference generated for continuous common resource blocks transmission, the maximum and minimum allocation scheme of resource blocks for CCEs allocation etc.

Thus, there is a need for an improved PDDCH resource allocation mechanism for optimized CORESET definition without compromising on the user data-rate requirements.

OBJECTS OF THE PRESENT DISCLOSURE

Some of the objects of the present disclosure, which at least one embodiment herein satisfies are as listed herein below.

It is an object of the present disclosure to provide a system and a method that considers a plurality of system level parameters such as connected users along with estimated user channel condition distribution in order to calculate the PDDCH resources during the start-up of the gNB system wherein the channel conditions directly consider of the slow and fast fading effect.

It is an object of the present disclosure to provide a system and a method that considers of feedback from a scheduler and an RRC entities to correct the estimated values during the steady state operation of the gNB system.

It is an object of the present disclosure to provide a system and a method that considers of both the candidates of the common and user specific search spaces.

It is an object of the present disclosure to provide a system and a method that considers the CCEs calculation and check whether it crosses the maximum value of radio resources. If it shoots up, then method decreases the CCEs to fit into the maximum radio resource limit.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system facilitating improved Physical downlink control channels (PDDCH) resource allocation in a wireless network. The system may include one or more user equipment communicatively coupled to the wireless network. The wireless network further may include a plurality of base stations, one or more packet gateway nodes; a scheduler configured to determine a user traffic data queued in the system. The system may also include a radio resource control unit (RRC) operatively coupled to any or a combination of one or more the base stations, the one or more packet gateway nodes and the scheduler. The RRC may comprise a processor that executes a set of executable instructions that are stored in a memory, upon which execution, the processor causes the system to: initialise an improved PDCCH resource calculation (IPRC) unit operatively coupled to the RRC. Upon initialization, the IPRC unit may receive from the one or more base stations, one or more data packets pertaining to parameters associated with one or more PDCCH resources that require allocation in the wireless network to the one or more user equipment getting registered with the system through the respective packet gateway node. The system may further extract, by the IPRC unit, a first set of attributes pertaining to one or more parameters associated with the one or more PDCCH resources and extract a second set of attributes from the scheduler, the second set of attributes pertaining to the user traffic data queued in the system that causes blocking of the one or more PDCCH resources. The IPRC unit may then calculate from the extracted first and second set of attributes, a plurality of operation parameters and the one or more PDCCH resources to be allocated; and update, by the IPRC unit, the number of the one or more PDCCH resources to the RRC and the scheduler.

In an aspect, the present disclosure provides for a method facilitating improved Physical downlink control channels (PDDCH) resource allocation in a wireless network. The method may include the step of initialising an improved PDCCH resource calculation (IPRC) unit operatively coupled to a radio resource control unit (RRC) operatively coupled to any or a combination of one or more said base stations, said one or more packet gateway nodes and the scheduler and upon initialization, the method may further include the step of receiving by the IPRC unit, from one or more base stations, one or more data packets pertaining to parameters associated with one or more PDCCH resources that require allocation in the wireless network to one or more user equipment getting registered with the system through a respective packet gateway node. The method may further include the step of extracting, by the IPRC unit, a first set of attributes pertaining to one or more parameters associated with the one or more PDCCH resources and the step of extracting, by the IPRC unit, a second set of attributes from the scheduler, the second set of attributes pertaining to the user traffic data queued in the system that causes blocking of the one or more PDCCH resources. Further, the method may include the step of calculating, by the IPRC unit, from the extracted first and second set of attributes, a plurality of operation parameters and the one or more PDCCH resources to be allocated; and the step of updating, by the IPRC unit, the number of the one or more PDCCH resources to the RRC and the scheduler.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 3 illustrates exemplary representation of an existing PDCCH-Configuration information element, in accordance with an embodiment of the present disclosure.

FIG. 4A-4B illustrate exemplary representations of CCE calculation for different Aggregation Levels, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to improve a Physical downlink control channels (PDCCH) resource allocation mechanism that has better resource block utilization without compromising on the service continuity and user data-rate requirement.

Figure 1A:
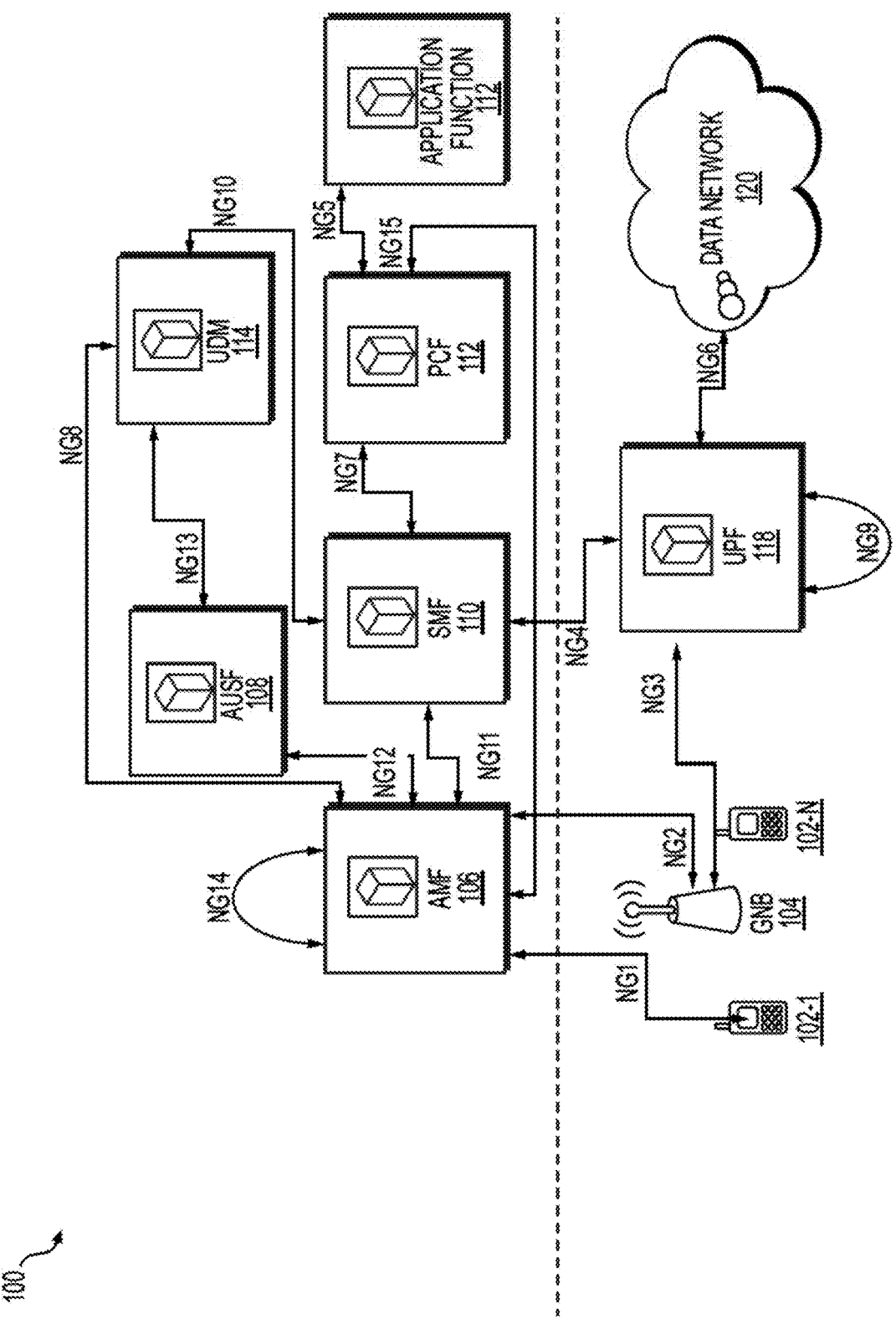
FIG. 1A illustrates an exemplary network architecture in which or with which the system of the present disclosure can be implemented, in accordance with an embodiment of the present disclosure.

FIG. 1 illustrates an exemplary network architecture in which or with which the system of the present disclosure can be implemented, in accordance with an embodiment of the present disclosure. As illustrated, in an aspect, a base station (104) (also referred to as gNB (104) may provide a user plane (122) and a control plane (124) protocol terminations towards one or more user equipment (102). In an exemplary embodiment, the user plane can be but not limited to a 5G New Radio's user plane and the base station can be but not limited to a 5G base station. The gNBs may be connected by means of a network gateway (NG) interfaces (NG1, NG2 . . . . NG15) to the 5GC, more specifically to an Access and Mobility Management Function (106) (AMF 106) by means of the NG2 interface (NG-Control) interface and to a User Plane Function (118) (UPF 118) by means of the NG3 (NG-User) interface. The network architecture (100) may further include an authentication server function (108) (AUSF 108), a user data management (114) (UDM 114), a session management function (110) (SMF 110), a policy control function (112) (PCF 112) and an application function unit (116).

The system may further include a scheduler configured to determine a user traffic data queued in the system and a radio resource control unit (RRC) operatively coupled to any or a combination of one or more the base stations, the one or more packet gateway nodes and the scheduler. The RRC may causes the system to initialise an improved PDCCH resource calculation (IPRC) unit operatively coupled to the RRC. Upon initialization, the IPRC unit, may receive from the one or more base stations, one or more data packets pertaining to parameters associated with one or more PDCCH resources that require allocation in the wireless network to the one or more user equipment getting registered with the system through the respective packet gateway node. The IPRC unit may extract a first set of attributes pertaining to one or more parameters associated with the one or more PDCCH resources and extract a second set of attributes from the scheduler, the second set of attributes pertaining to the user traffic data queued in the system that causes blocking of the one or more PDCCH resources. The IPRC unit can then calculate a plurality of operation parameters and the one or more PDCCH resources to be allocated from the extracted first and second set of attributes and update the number of the one or more PDCCH resources to the RRC and the scheduler.

In an exemplary embodiment, the IPRC unit may receive a combination of periodic performance feedback from the scheduler and a constant usage periodic feedback from the RRC to update the IPRC unit. The combination of periodic performance feedback from the scheduler and the constant usage periodic feedback from the RRC correct a plurality of estimated values during a steady state operation of the system. The IPRC unit further may optimize the calculation of the one or more PDCCH resources by a set of predefined instructions.

In an embodiment, during the initialization of the IPRC unit, the IPRC unit can interact with a configuration database coupled to the system through a configuration interface to get default configuration parameters of the system during a start-up of the system. The IPRC unit can then store the operational parameters and the default configuration parameters of the system.

In an embodiment, the IPRC may be in a reconfiguration mode when there is change in the default system configuration parameters. Upon change in the default system configuration parameters, the IPRC can receive configuration information through a communication interface coupled to the system.

In an embodiment, the IPRC unit in the reconfiguration mode is configured to: take a plurality of latest configuration parameters from the configuration database; configure the plurality of latest parameters in the IPRC unit; and store the latest configuration parameters in a local copy in a memory unit coupled to the IPRC unit.

In an embodiment, if the IPRC is not in the start-up mode or in the re-configuration mode, then the IPRC unit can load a local copy of the configuration parameters of the system into the memory unit.

In an exemplary embodiment, depending on a geographical deployment area, the IPRC unit may accept the default configuration parameters of the system.

In an embodiment, the IPRC unit may dynamically generate the operational parameters for PDCCH resource calculation for a plurality of aggregation levels based on the system variables and conditions. The IPRC unit may further consider a plurality of system level parameters and estimated user channel condition distribution in order to calculate the PDDCH resources during the start-up of the system. In an exemplary embodiment, the channel conditions may include but not limited to slow and fast fading effect.

In an exemplary embodiment, the IPRC unit may check whether a maximum value of the PDCCH resources is crossed. If the maximum value of the PDCCH resources is crossed, then the IPRC unit decreases a Control Channel Element (CCE) to fit into the maximum value of the PDCCH resources.

In an exemplary embodiment, the functions for Radio Resource control (RRC) unit (also referred to as radio resource management) may include: Radio Bearer Control, Radio Admission Control, Connection Mobility Control, Dynamic allocation of resources to UEs in both uplink and downlink (scheduling); IP header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (originated from the AMF or OAM); Measurement and measurement reporting configuration for mobility and scheduling; Transport level packet marking in the uplink; Session Management; Support of Network Slicing; QOS Flow management and mapping to data radio bearers; Support of UEs in RRC_INACTIVE state; Distribution function for NAS messages; Radio access network sharing; Dual Connectivity; Tight interworking between NR and E-UTRA but not limited to the like.

The AMF (106) may host the following main functions: NAS signalling termination; NAS signalling security; AS Security control; Inter CN node signalling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; SMF selection but not limited to the like.

The UPF (118) may host the following main functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (SDF to QoS flow mapping); Downlink packet buffering and downlink data notification triggering but not limited to the like.

The SMF (110) may host the following main functions: Session Management; UE IP address allocation and management; Selection and control of UP function; Configures traffic steering at UPF to route traffic to proper destination; Control part of policy enforcement and QoS; Downlink Data Notification but not limited to the like.

The PCF (112) may host the following main functions: The 5G PCF performs the same function as the PCRF in 4G networks; Provides policy rules for control plane functions. This includes network slicing, roaming and mobility management; Accesses subscription information for policy decisions taken by the UDR; Supports the new 5G Qos policy and charging control functions but not limited to the like.

The AUSF (108) may host the following main functions: The AUSF performs the authentication function of 4G HSS; Implements the EAP authentication server; Stores keys but not limited to the like.

The UDM (114) may host the following main functions: The UDM performs parts of the 4G HSS function; Generation of Authentication and Key Agreement (AKA) credentials; User identification; Access authorization; Subscription management; but not limited to the like.

The AF (116) may host the following main functions: Application influence on traffic routing; Accessing Network Exposure Function; Interaction with the policy framework for policy control but not limited to the like.

The communication between the gNB (104) and the user equipment (102) may happen through a wireless interface using the protocol stacks. One of the main protocol stacks is the Physical layer (also referred to as PHY). Whenever, a user traffic data from a data network (120) needs to be sent to the user equipment (102), the user traffic data passes through the UPF (118) and the gNB (104) and reaches the user equipment (102) in a downlink direction and vice-versa for an uplink direction. In order to schedule the user traffic data in the downlink direction, at least two main PHY layer functionalities comes in consideration are (a) Physical-layer processing for physical downlink shared channel (PDSCH) (b) Physical-layer processing for Physical downlink control channels (PDCCH). In an exemplary embodiment, a user's traffic data may be sent through the PDSCH but a user's signaling data of the user's traffic data with respect to (i) Modulation (ii) Coding rate (iii) Size of the user's traffic data (iv) Transmission beam identification (v) Bandwidth part (vi) Physical Resource Block and the like may be sent via PDCCH. The downlink as well as the uplink transmission may happen through a Cyclic Prefix based Orthogonal Frequency Division Multiplexing (CP-OFDM) but not limited to it, which is part of the PHY layer. So, in order to do the transmission, the CP-OFDM may use the Physical Resource Block (PRB) to send both the user's traffic data over PDSCH as well as user's signaling data over PDCCH.

In an exemplary embodiment, the Physical Resource Block (PRB) may be built using the Resource Elements. For the downlink direction, the upper layer stacks ma assigns the number of Resource Elements to be used for the PDCCH and PDSCH processing. There may be at least four important concepts that has been defined for with respect to resources and the way the resources are being group to be given for PDCCH. These concepts are (a) Resource Element: It is the smallest unit of the resource grid made up of one subcarrier in frequency domain and one OFDM symbol in time domain. (b) Resource Element Group (REG): One REG is made up of one resource block (12 Resource Element in frequency domain) and one OFDM symbol in time domain. (c) Control Channel Element (CCE): A CCE is made up multiple REGs. The number REG bundles within a CCE varies. (d) Aggregation Level: The Aggregation Level indicates how many CCEs are allocated for a PDCCH. The Aggregation Level and the number of allocated CCE as given in Table-1:

| Aggregation Level | Number of CCEs |
|---|---|
| 1 | 1 |
| 2 | 2 |
| 4 | 4 |
| 8 | 8 |
| 16 | 16 |

In an aspect, the gNB (104) may include one or more processors operatively coupled to a memory that may cause the gNB to receive user traffic data from a plurality of candidates, identify relevant candidates for each aggregation level based on service and content for effective radio resource usage with respect to the CCEs. The relevant candidates may be identified by enabling a predefined set of system parameters for candidate calculation. Depending on a geographical deployment area, the processor can cause the gNB system to accept the predefined system parameters of the configuration, self-generate operational parameter values for candidate calculation and dynamically generates operational parameter values for the candidate calculation for various aggregation levels based on the gNB system variables and conditions thereby improving candidate calculation for different aggregation levels, update the default system parameters for efficient number of candidate calculation by obtaining periodic feedback from a Scheduler and an RRC to update the default system parameters.

Figure 1B:
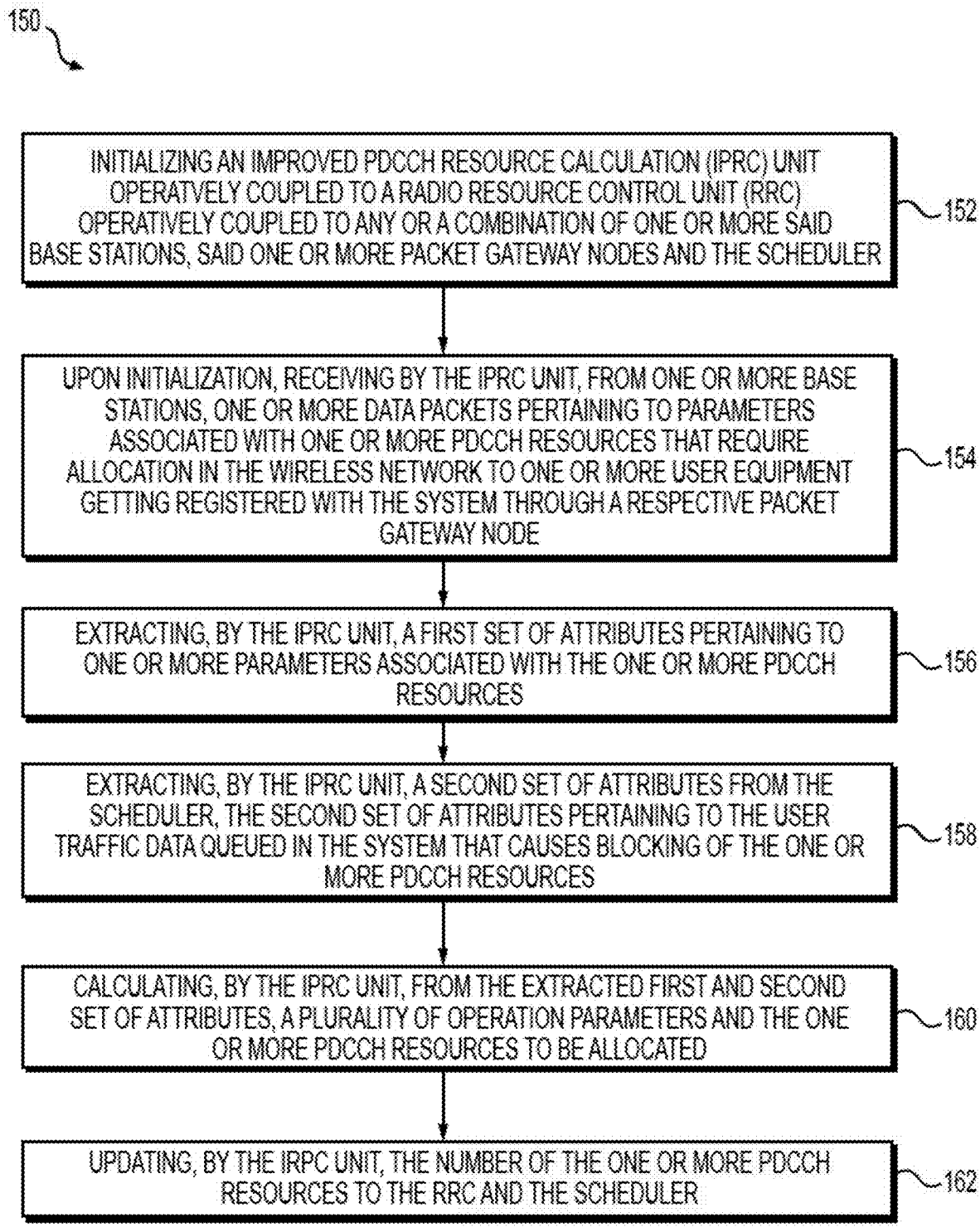
FIG. 1B illustrates an exemplary flow diagram of the proposed method, in accordance with an embodiment of the present disclosure.
Figure 2B:
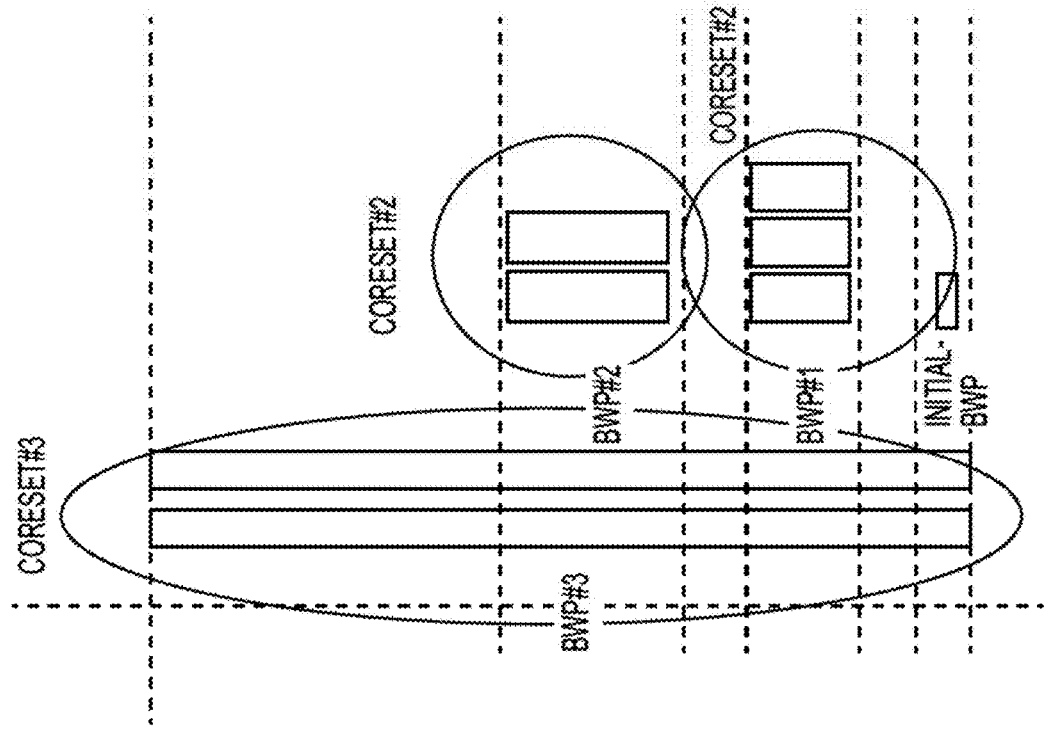
FIGS. 2A-2B illustrate exemplary representations of an existing Bandwidth part method for resource allocation, in accordance with an embodiment of the present disclosure.
Figure 2A:
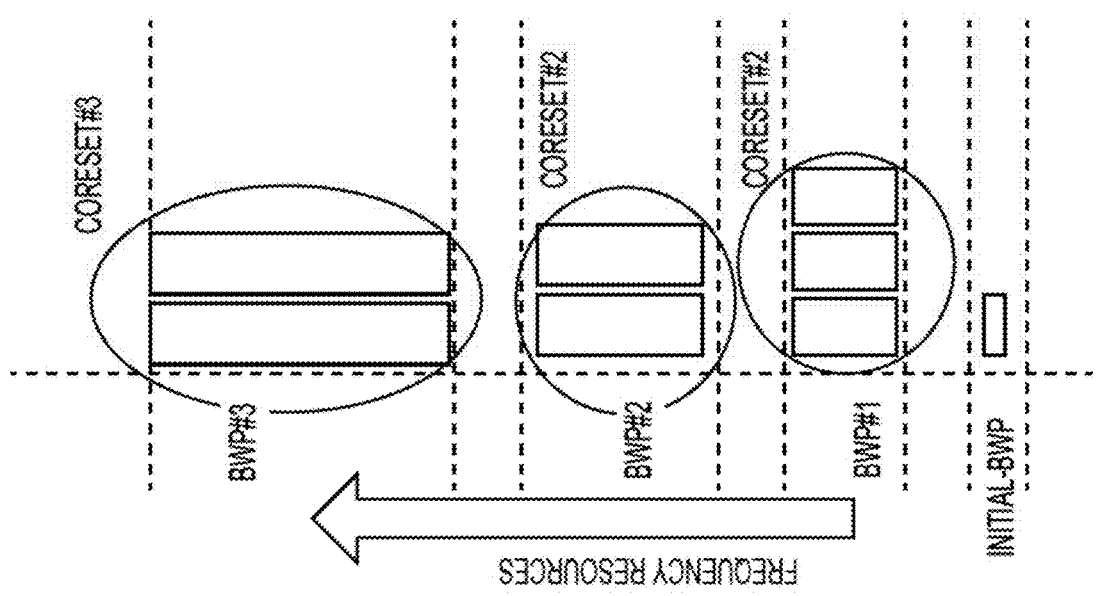

FIG. 1B illustrates an exemplary flow diagram of the proposed method (150)) facilitating improved Physical downlink control channels (PDDCH) resource allocation in a wireless network. The method may include at 152, the step of initialising an improved PDCCH resource calculation (IPRC) unit operatively coupled to a radio resource control unit (RRC) operatively coupled to any or a combination of one or more said base stations, said one or more packet gateway nodes and the scheduler and upon initialization, the method may further include at 154, the step of receiving by the IPRC unit, from one or more base stations, one or more data packets pertaining to parameters associated with one or more PDCCH resources that require allocation in the wireless network to one or more user equipment getting registered with the system through a respective packet gateway node.

The method (150) may further include at 156 the step of extracting, by the IPRC unit, a first set of attributes pertaining to one or more parameters associated with the one or more PDCCH resources and at 158, the step of extracting, by the IPRC unit, a second set of attributes from the scheduler, the second set of attributes pertaining to the user traffic data queued in the system that causes blocking of the one or more PDCCH resources.

Further, the method (150) may include at 160, the step of calculating, by the IPRC unit, from the extracted first and second set of attributes, a plurality of operation parameters and the one or more PDCCH resources to be allocated; and at 162 the step of updating, by the IPRC unit, the number of the one or more PDCCH resources to the RRC and the scheduler.

Figure 5:
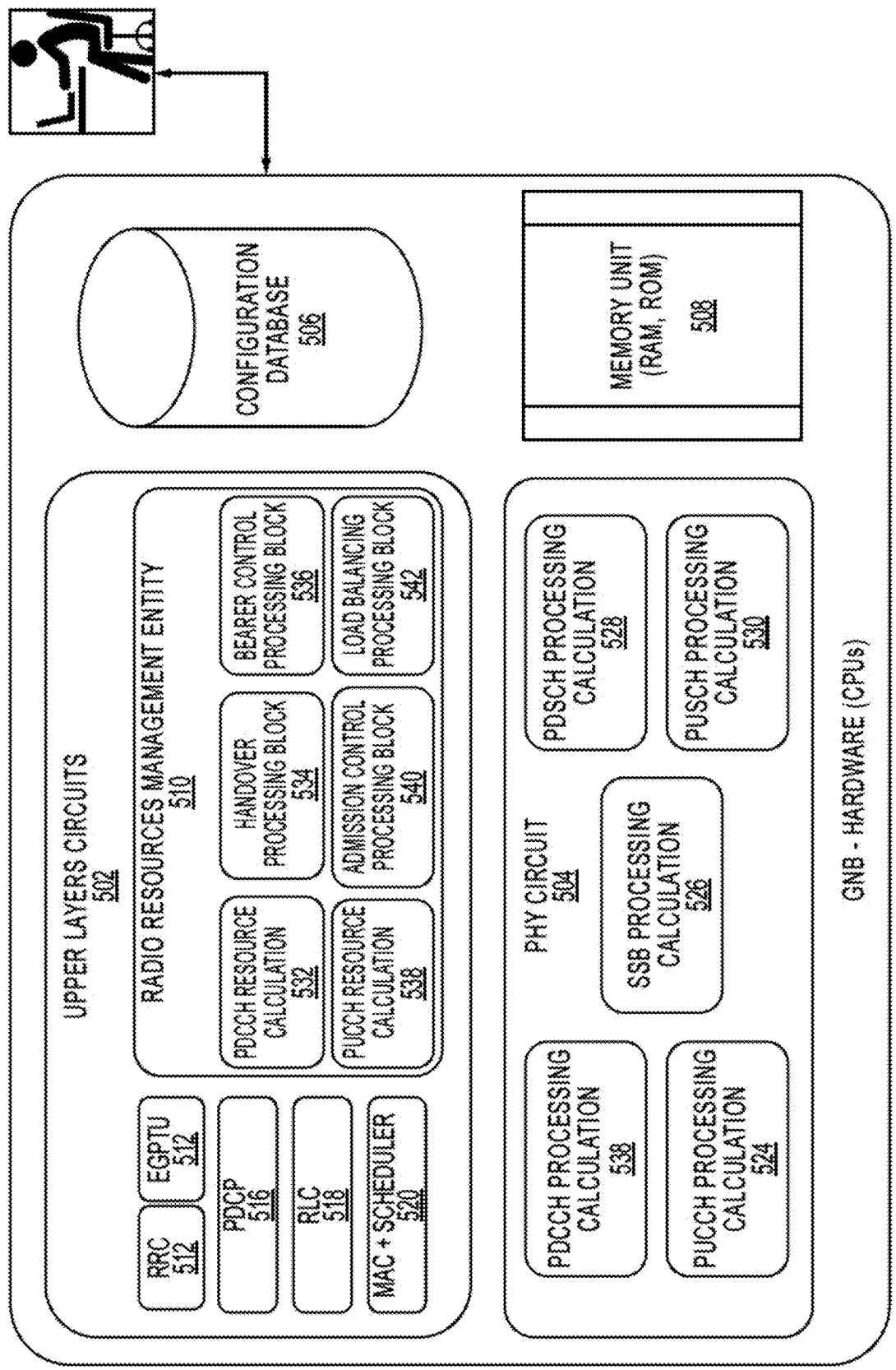
FIG. 5 illustrates a typical reference implementation level of an existing gNB system (500), in accordance with an embodiment of the present disclosure.

FIG. 5 illustrates a typical reference implementation level of an existing gNB system (500). As seen in FIG. 5, the gNB system may include a plurality of components over a hardware including a configuration database (506), memory unit(s) (508) and an Upper Layer circuit (502) and a physical circuit (504). The upper layer circuit (502) may include a processing unit such as a Radio Resource Management unit (510) which has a sub-item called Physical downlink control channels (PDCCH) Resource calculation (532). The PDCCH Resource calculation (532) is configured to manage functionalities associated with control resource set (CORE-SET) and search space design. The gNB system (500) may further include an RRC (512), eGTPU (514). PDCP (516). MAC and Scheduler (520) in the upper circuit layer. The Scheduler is a real time entity which considers of the user traffic data queued in the gNB system and calculates various PDCCH blocking which is fed back to the method.

The PHY layer may include PDCCH processing block (522). PUCCH processing block (524), SSB processing block (526). PDSCH processing block (528), PUSCH processing block (530). The radio resource management unit (510) may further include handover processing block (534), bearer control processing block (536). PUCCH resource calculation (538), admission control processing block (540), load balancing processing block (542). The PDSCH may include functions such as Transport block CRC attachment; Code block segmentation and code block CRC attachment; Channel coding; LDPC coding but not limited to it; Physical-layer hybrid-ARQ processing; Rate matching; Scrambling; Modulation: QPSK, 16QAM, 64QAM and 256QAM but not limited to it; Layer mapping; Mapping to assigned resources and antenna ports but not limited to it.

The detailed processing of Physical-layer processing for Physical downlink control channels (PDCCH) may include Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling. PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure; PDCCH candidates in the configured monitoring occasions in one or more configured control resource sets (CORESETs) according to the corresponding search space configurations. A CORESET consists of a set of PRBs with a time duration of 1 to 3 OFDM symbols but not limited to it. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

The detailed processing of Physical-layer processing for Synchronization signal and PBCH (SSB) may include primary and secondary synchronization signals (PSS, SSS), Broadcast information but not limited to it. The detailed processing of Physical-layer processing for physical uplink shared channel (PUSCH) may include Transport Block CRC attachment; Code block segmentation and Code Block CRC attachment; Channel coding: LDPC coding; Physical-layer hybrid-ARQ processing; Rate matching; Scrambling; Modulation: $\pi/2$ BPSK (with transform precoding only), QPSK, 16QAM, 64QAM and 256QAM but not limited to it; Layer mapping, transform precoding (enabled/disabled by configuration), and pre-coding; Mapping to assigned resources and antenna ports but not limited to it.

The detailed processing of Physical-layer processing for Physical uplink control channel (PUCCH) may include:
Format #0: Short PUCCH of 1 or 2 symbols with small UCI payloads of up to two bits with UE multiplexing capacity of up to 6 UEs with 1-bit payload in the same PRB;
Format #1: Long PUCCH of 4-14 symbols with small UCI payloads of up to two bits with UE multiplexing capacity of up to 84 UEs without frequency hopping and 36 UEs with frequency hopping in the same PRB;
Format #2: Short PUCCH of 1 or 2 symbols with large UCI payloads of more than two bits with no UE multiplexing capability in the same PRBs;
Format #3: Long PUCCH of 4-14 symbols with large UCI payloads with no UE multiplexing capability in the same PRBs;
Format #4: Long PUCCH of 4-14 symbols with moderate UCI payloads with multiplexing capacity of up to 4 UEs in the same PRBs.

The short PUCCH format of up to two UCI bits is based on sequence selection, while the short PUCCH format of more than two UCI bits frequency multiplexes UCI and DMRS. The long PUCCH formats time-multiplex the UCI and DMRS. Frequency hopping is supported for long PUCCH formats and for short PUCCH formats of duration of at least 2 symbols. Long PUCCH formats can be repeated over multiple slots. A UCI multiplexing in PUSCH is supported when UCI and PUSCH transmissions coincide in time, either due to transmission of a UL-SCH transport block or due to triggering of A-CSI transmission without UL-SCH transport block: UCI carrying HARQ-ACK feedback with 1 or 2 bits is multiplexed by puncturing PUSCH; In all other cases UCI is multiplexed by rate matching PUSCH. The UCI consists of the following information: CSI; ACK/NAK; Scheduling request but not limited to it.

Figure 6A:
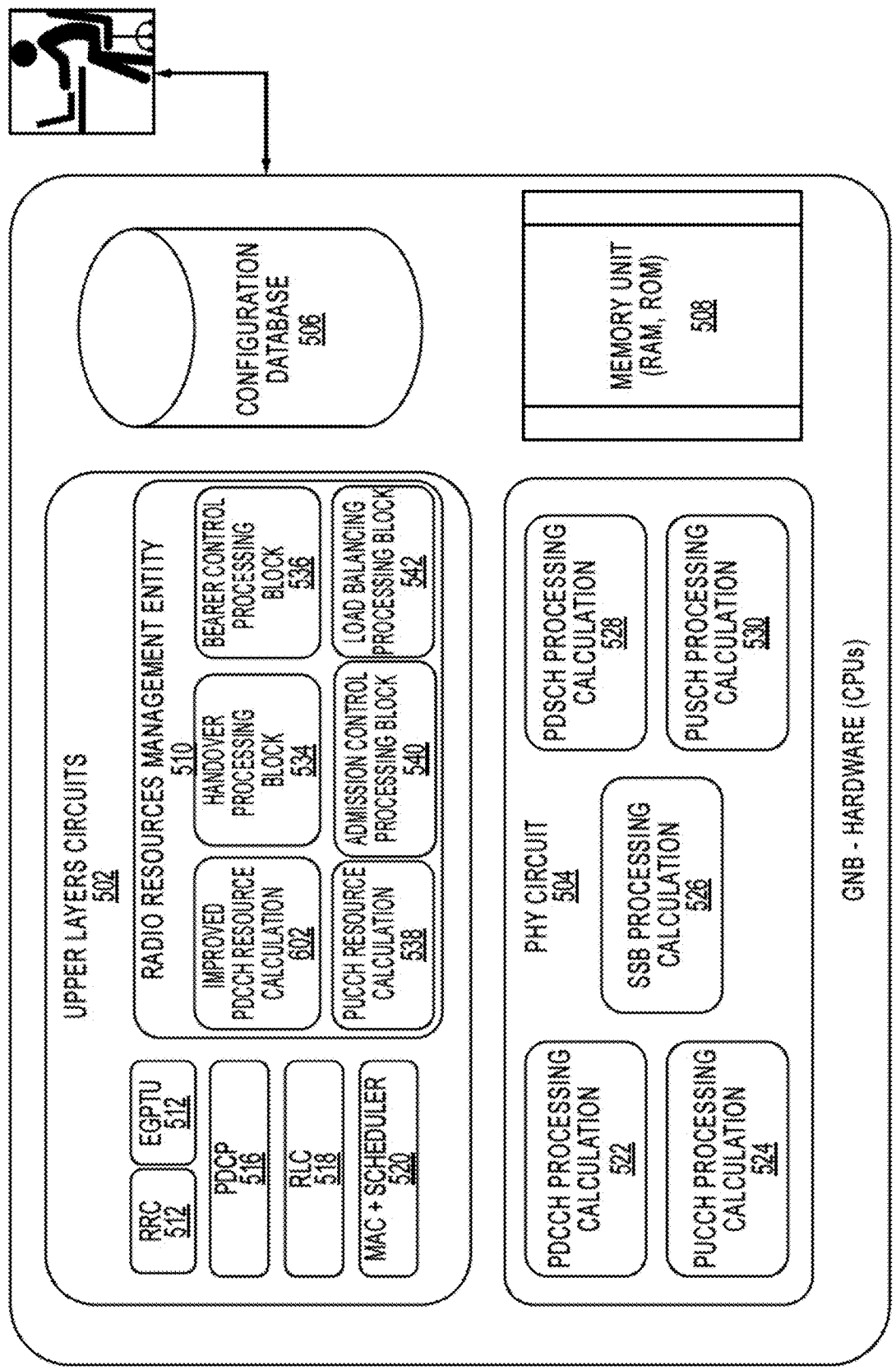
FIGS. 6A-6B illustrate exemplary representations of the proposed gNB system (600), in accordance with an embodiment of the present disclosure.
Figure 6B:
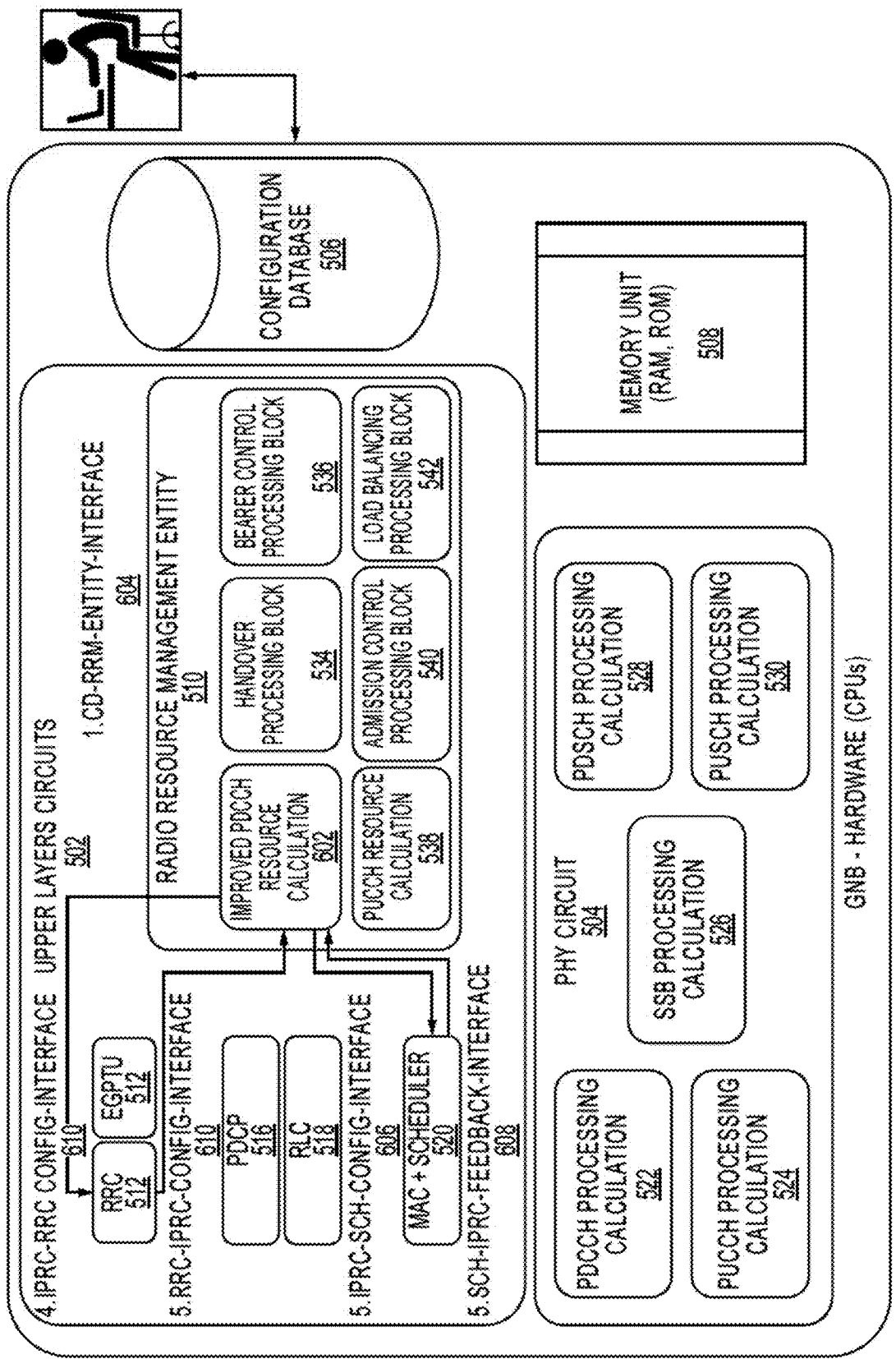

Referring to FIGS. 6A and 6B that illustrates an exemplary gNB system (600) of the present disclosure can be implemented, in accordance with an embodiment of the present disclosure. As illustrated in FIG. 6A, by way of example but not limitation, the exemplary gNB system (600) may include an improved PDCCH Resource calculation (IPRC) (602) as illustrated in FIG. 6B that may be configured to enable default system parameters for relevant candidate calculation. Depending on the geographical deployment area, gNB may accept a default system configuration, self-generate operational parameter values for the candidate calculation, dynamically generate operational parameter values for candidate calculation for various aggregation levels based on the gNB system variables and conditions. Update candidate calculation for different aggregation levels by obtaining periodic feedback from a scheduler and the RRC to update the default system parameters. FIG. 6A depicts an improved gNB that has the new module named IPRC (602) which has been introduced inside the Radio Resource Management entity. As part of this improvement, the interaction between IPRC and rest of the modules of the Upper Layers Circuit has been changed. A more detailed diagram showing the interaction of IPRC with other entities are shown in FIG. 6B.

As per FIG. 6B, in an aspect, the Radio Resource Management (510) entity may obtain configuration information from the Configuration Database (506) (CD) through a CD-RRM-Entity-Interface during start of the system (600). After that the IPRC (602) which is part of Radio Resource Management unit (510) may obtain a necessary configuration and load the configuration into a persistent-memory unit (508) (IPRC-PMU) for a Local-Configuration (LC). In an exemplary embodiment, the IPRC (602) may cause the Radio Management unit (510) to: extract the necessary configuration information for the PDCCH resource calculation by accessing Local-Configuration (LC) of the IPRC-PMU; determine the overall resource configuration and update the system configuration information in the persistent-memory unit IPRC-Sys-PMU (508). The updated resource configuration information may be then sent to the RRC (512) and the Scheduler (514) via IPRC-RRC-Config-Interface and IPRC-Sch-Config-Interface respectively. The Scheduler (514) Myalso send some performance metrics periodic to the IPRC via the Sch-IPRC-Feedback-Interface. The RRC may also send some metrics periodic based to the IPRC via the RRC-IPRC-Feedback-Interface.

In an embodiment, the IPRC (602) in the gNB may be responsible for calculating the PDCCH resources for the overall gNB system (104) which will be finally allocated to the user equipment (102) which are getting registered with the gNB system (104).

In an exemplary embodiment, in order to perform the resource calculation, the IPRC may interact with the Configuration Database through the configuration interface CD-RRM-Entity-Interface to get the default system parameters during the start-up of the gNB system. During the steady state, once the resource calculation is done, the IPRC may update the resource information to the RRC and the Scheduler via another configuration APIs IPRC-RRC-Config-Interface and IPRC-Sch-Config-Interface respectively. Also, during the steady state the dynamic behavior of the IPRC is maintained via the constant periodic feedback from the Scheduler via a feedback API Sch-IPRC-Feedback-Interface and from RRC via RRC-IPRC-Feedback-Interface.

In an embodiment, the IPRC may keep all the configuration related to predefined system parameters in a Local Copy (LC) for example in the persistent memory unit IPRC-PMU. As a way of example and not as a limitation, the predefined system parameters that can be stored are given below:

ConnUsers: This configuration parameter gives the total number of connected users that are successfully got registered with the gNB system.

Total_QFI: This configuration parameter gives the total number of Quality of Service Flow Indicators (QFI) supported in the gNB system.

Percentage_UserDist_per_QFI(i): This configuration parameter gives the percentage distribution of the total number of ConnUsers across the different QFI. The index-i can be varied for multiple QFIs supported in the gNB system.

Number_of_cov_dist: This configuration parameter gives the number of coverage distribution zone assumed within the transmission area of the gNB system.

Percentage_User_per_Cov_Dist(i): This configuration parameter gives the percentage distribution of the total number of connected users (i.e. ConnUsers) that are distributed across coverage area. The coverage distribution could be done based on the signal quality received by the user equipment.

Number_of_sig_msg: This configuration parameter gives the total number of signaling messages supported in the gNB system. For example, these signaling messages could be Other System Information, Paging and Random Access and the like.

Prob_of_Sig_Msg(i): This configuration parameter gives the probability that the out of the total PDCCH messages that get generated from the gNB system for the User Equipment, how many such PDCCH messages are generated for sending ith signaling message.

Prob_of_Non-Sig_Msg(i): This configuration parameter gives the probability that the out of the total PDCCH messages that get generated from the gNB system for the User Equipment, how many such PDCCH messages are generated for sending ith non-signaling message.

Number_of_msg_per_user_per_service(i): This configuration parameter gives the average number of messages that get exchanged between the user equipment and the gNB system for a service for a periodic instant of time. The index-i can be varied for multiple services supported in the gNB system. These services could be categorized as enhanced broadband (eMBB), Ultra Reliable Low Latency Communication (URLLC) and Massive Internet of Things (mIoT).

5G_Numerology: This configuration parameter gives the different 5G numerology supported in the gNB system. The numerology is defined from the set of values as {0,1,2,3,4}

Total_sig_msgs: This configuration parameter gives the total signaling messages that would be supported in the gNB system. These signaling messages could be for Other-System-Information, Paging and Random Access. Taking the above three signaling messages, the value of the Total_sig_msgs would be 3.

Total_Aggr_Lvl_sig: This configuration parameter gives the total aggregation levels defined for all the signaling messages that would be supported in the gNB system. And the aggregation levels supported for the above signaling messages are {4,8,16}. Taking the above three signaling messages, the value of the Total_Aggr_Lvl_sig would be 3.

Sig_Aggr_Lvl(i)(j): This configuration parameter gives the aggregation levels to be allocated to the different signaling messages. The index-i can be varied for different type of signaling messages supported in the gNB system. And index-j can be varied for different type of aggregation levels given to each of the ith signaling message supported in the gNB system. For example, for the Other-System-Information, this parameter Aggr_Lvl_for_sig(i)(j) will hold how many different aggregation levels would be defined. The aggregation levels can be of any combination of {4,8,16}.

Total_non-sig_msgs: This configuration parameter gives the total signaling messages that would be supported in the gNB system. One of the examples of the non-signaling messages could be for the traffic data for the user equipment.

Total_Aggr_Lvl_non-sig: This configuration parameter gives the total aggregation levels defined for all the non-signaling messages that would be supported in the gNB system. And the aggregation levels supported for the above signaling messages are {1,2,4,8,16}. Taking the above three signaling messages, the value of the Total_Aggr_Lvl_sig would be 5.

Non-sig_Aggr_Lvl(i)(j): This configuration parameter gives the aggregation levels to be allocated to the non-signaling messages based on the coverage distribution zone. The index-i can be varied for different type of non-signaling messages supported in the gNB system. And index-j can be varied for different type of aggregation levels given to each of the ith non-signaling message supported in the gNB system. For example, for the traffic data, this parameter Aggr_Lvl_for_non-sig(i)(j) will hold how many different aggregation levels would be defined. The aggregation levels can be of any combination of {1,2.4,8,16}.

Obsr_duration: This configuration parameter gives the total time duration for calculating the resource calculation method.

Feedbk_time: This configuration parameter gives the time duration for accumulating the number of messages for that get exchanged between the user equipment and the gNB system for a service.

HYST: This configuration parameter gives the hysteresis value for controlling the differences between two entities.

PDCCH_Blk_per_CovDist(i)_per_QFI(j)_per_Sig_msg (k)_per_Aggr_Lvl(l)_Th: This configuration parameter gives the threshold value of the PDCCH blocking for a user equipment's signaling messages in case of specific coverage distribution, QFI, signaling message and Aggregation level.

PDCCH_Blk_per_CovDist(i)_per_QFI(j)_per_non-Sig_msg(k)_per_Aggr_Lvl(l)_Th: This configuration parameter gives the threshold value of the PDCCH blocking for a user equipment's signaling messages in case of specific coverage distribution, QFI, signaling message and Aggregation level Max_Number_PDCCH_candidate_for_Sig_per_Aggr_Lvl(i): This configuration parameter gives the values from previously known values in the art.

Sys_Res_Avail: This configuration parameter gives the value of the total radio resources available in the gNB system. For example, for 5G_Numerology=0, the total radio resources shall be 275

STEP_cand: This configuration parameter gives the value of increase or decrease the number of PDCCH candidates in the gNB system.

STEP_aggr_Lvl: This configuration parameter gives the value of increase or decrease the number of aggregation levels per Signaling or Non-Signaling messages in the gNB system.

During the steady state, IPRC keeps all the configuration related to operation parameters in Local Copy (LC) e.g. of persistent memory unit IPRC-PMU. These parameters that been stored are given below:

UserDist_per_QFI(i): This is an operational parameter that describes the user distribution across different QFI values. This is calculated by the Step-2 of proposed method section.

User_per_Cov_Dist(i): This is an operational parameter that describes the user distribution across different coverage distribution. This is calculated by the Step-2 of proposed method section.

Number_of_Sig_msgs_per_CovDist(i)_per_QFI(j): This is operational parameter that gives the total number of Signaling messages getting generated for the ith coverage distribution zone of the gNB system per jth QFI. This is calculated by the Step-2 of proposed method section.

Number_of_non-Sig_msgs_per_CovDist(i)_per_QFI(j): This is operational parameter that gives the total number of Signaling messages getting generated for the ith coverage distribution zone of the gNB system per jth QFI. This is calculated by the Step-2 of proposed method section.

Obsr_duration_per_service(i): This is operational parameter that gives the total number of counts for executing the proposed method. This is calculated by the Step-2 of proposed method section.

Number_of_PDCCH_candidate_per_CovDist(i)_per_QFI(j)_per_Sig_msg(k)_per_Aggr_Lvl(l): This is operational parameter that gives the total number of PDCCH candidates for the ith coverage distribution zone of the gNB system per jth QFI, for kth signaling message and for lth aggregation level. This is calculated by the Step-2 of proposed method section.

Number_of_PDCCH_candidate_per_CovDist(i)_per_QFI(j)_per_non-sig(k)_per_Aggr_Lvl(l): This is operational parameter that gives the total number of PDCCH candidates for the ith coverage distribution zone of the gNB system per jth QFI, for kth signaling message and for lth aggregation level.

Figure 7:
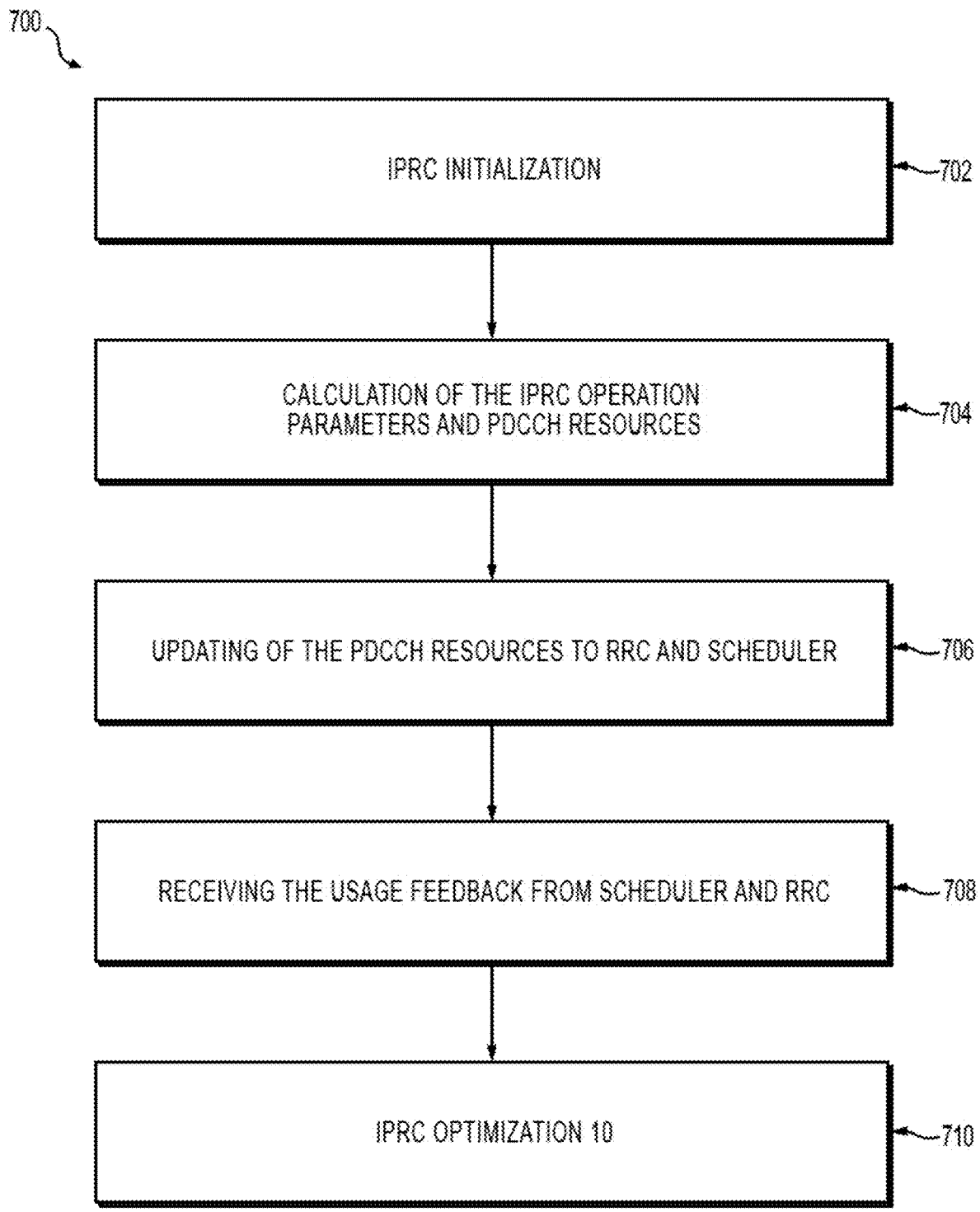
FIG. 7 illustrates an exemplary representation (700) of a flow diagram of the proposed method, in accordance with an embodiment of the present disclosure.

FIG. 7 illustrates an exemplary flow diagram for the proposed method for improved PDCCH resource allocation according to an embodiment of the present disclosure. As illustrated, in an aspect, he proposed method (700) may include at 702 the step of initializing the IPRC. If the IPRC is in start-up mode, the IPRC performs start-up initialization. During initialization the IPRC may perform the following steps such as:

The IPRC may take the latest inputs of the configuration parameters from the Configuration Database via CD-RRM-Entity-Interface such as ConnUsers, Total_QFI, Percentage_UserDist_per_QFI(i), Number_of_cov_dist, Percent age_User_per_Cov_Dist(i), Number_of_sig_msg, Prob_of_Sig_Msg(i), Prob_of_Non-Sig_Msg(i), Number_of_msg_per_user_per_service (i), 5G_Numerology, Total_sig_msgs, Total_Aggr_Lvl_sig, Sig_Aggr_Lvl(i)(j), Total_non-sig_msgs, Total_Aggr_Lvl_non-sig, Non-sig_Aggr_Lvl(i)(j), Obsr_duration, Feedbk_time, and the like and configure the received parameters in the IPRC.

The IPRC may then store the received configuration parameters in the local copy in the memory of the IPRC-PMU.

Else if the IPRC is in Reconfiguration Mode, then the IPRC may Perform Reconfiguration (IPRC already up and there is change in IPRC default system configuration).

If there is any change in configuration parameters, the IPRC may receive configuration information through a communication interface (CD-RRM-Entity-Interface).

The IPRC then performs following steps of
Taking the latest inputs of configuration parameters from Configuration Database
Configuring latest parameters in IPRC.
Storing the latest configuration parameters in local copy in memory of IPRC-PMU Else if the load current configuration.
In case the IPRC is not in start-up mode nor in re-configuration mode, then IPRC loads a local copy of the configuration into its memory using following steps:

The IPRC may loads local configuration (LC) from Configuration Database to own memory for configuring IPRC-PMU with the configuration parameters such as ConnUsers, Total_QFI,Percentage_UserDist_per_QFI(i), Number_of_cov_dist, Percentage_User_per_Cov_Dist(i), Number_of_sig_msg, Prob_of_Sig_Msg(i), Prob_of_Non-Sig_Msg(i), Number_of_msg_per_user_per_service (i), 5G_Numerology, Total_sig_msgs, Total_Aggr_Lvl_sig, Sig_Aggr_Lvl(i)(j), Total_non-sig_msgs, Total_Aggr_Lvl_non-sig, Non-sig_Aggr_Lvl(i)(j), Obsr_duration, Feedbk_time, and the like.

The method (700) may further include at 704, the step of calculating the IPRC operation parameters and PDCCH Resources. The IPRC may calculate the operation parameters and the PDCCH resources as per the following exemplary set of instructions: wherein a first instruction may include the steps provided in the tables below:

TABLE 2

For each $i^{th}$ QFI value from total Total_QFI

The number of users that are distributed for every QFI will be calculated by doing the product multiplication of two parameters mainly the Percentage_UserDist_per_QFI(i) andConnUserswhich is given below UserDist_per_QFI(i) =Percentage_UserDist_per_QFI(i) * ConnUsers
  End For

TABLE 3

For each of $i^{th}$ coverge distribution zone value from total Number_of_cov_dist
The number of users that are distributed for every coverage zone will be calculated by doing the product multiplication of two parameters mainly the Percentage_User_per_Cov_Dist(i) andConnUserswhich is given below User_per_Cov_Dist(i)=

TABLE 3-continued

Percentage_User_per_Cov_Dist(i)* ConnUsers
End For
Calculate the Observation duration for each service i.e. Obsr_duration_per_service(i) = Obsr_duration / (2^5G_Numerology)

TABLE 4

For each $i^{th}$ coverage distribution zone value from total Number_of_cov_dist
    For each $j^{th}$ QFI value from total Total_QFI
        The total number of signaling messages getting generated per gNB system
            Number_of_Sig_msgs_per_CovDist(i)_per_QFI(j) =
            Prob_of_Sig_Msg(j) * User_per_Cov_Dist(i)
        The total number of signaling messages getting generated per gNB system
            Number_of_non-Sig_msgs_per_CovDist(i)_per_QFI(j)
            Prob_of_Non-Sig_Msg(j) * User_per_Cov_Dist(i)
    End For
End For

TABLE 5

For a specific service index-p: LOOP
For each $i^{th}$ coverage distribution zone value from total Number_of_cov_dist
    For each $j^{th}$ QFI value from total Total_QFI
        For each of $k^{th}$ signaling messages from total Total_sig_msgs
            For each of $l^{th}$ aggregation level from total Total_Aggr_Lvl_sig
                The number of PDCCH candidates for signaling messages:
    Number_of_PDCCH_candidate_per_CovDist(i)_per_QFI(j)_per_Sig_msg(k)_per_Aggr_Lvl(l) =
Number_of_Sig_msgs_per_CovDist(i)_per_QFI(j) /
    Obsr_duration_per_service(p)
IF(Number_of_PDCCH_candidate_per_CovDist(i)_per_QFI(j)_per_Sig_msg(k)_per_Aggr_Lvl(l) >=
Max_Number_PDCCH_candidate_for_Sig_per_Aggr_Lvl(i) )
Override the calculation value of
Number_of_PDCCH_candidate_per_CovDist(i)_per_QFI(j)_per_Sig_msg(k)_per_Aggr_Lvl(l) with the maximum value
End IF
        The number of PDCCH candidates for non-signaling messages:
    Number_of_PDCCH_candidate_per_CovDist(i)_per_QFI(j)_per_Non-Sig_msg(k)_per_Aggr_Lvl(l) =
Number_of_non-Sig_msgs_per_CovDist(i)_per_QFI(j) /
    Obsr_duration_per_service(p)
The total PDCCH candidates per Aggregation Level (l) = ΣΣΣ
(Number_of_PDCCH_candidate_per_CovDist(i)_per_QFI(j)_per_Sig_msg(k)_per_Aggr_Lvl(l) +
Number_of_PDCCH_candidate_per_CovDist(i)_per_QFI(j)_per_Non-Sig_msg(k)_per_Aggr_Lvl(l))
Calculate the number of CCEs per aggregation level using Table-I
Check the limit of the Resource availability based on the CCE calculation
IF number of CCEs exceeds the Sys_Res_Avail
    Decrease the PDCCH candidates for Non-Signaling by STEP_cand
End IF
            End For (aggregation level)
        End For (signaling messages)
    End For (QFI)
End For (Coverage Distribution zone)
Repeat LOOP for different service The method (700) may further include at 706, the step of updating of the PDCCH Resources to the RRC and the Scheduler. The IPRC may update the resource information to the RRC and Scheduler via another configuration APIs IPRC-RRC-Config-Interface and IPRC-Sch-Config-Interface respectively. The main parameters that IPRC updates are given below:

Number_of_PDCCH_candidate_per_CovDist(i)_per_QFI(j)_per_Sig_msg(k)_per_Ag gr_Lvl(l).
Number_of_PDCCH_candidate_per_CovDist(i)_per_QFI(j)_per_Non-Sig_msg(k)_per_Aggr_Lvl(l)

The method (700) may further include at 708 of receiving the Usage Feedback from the Scheduler and the RRC. In an embodiment, the Scheduler may give constant periodic performance feedback via an API Sch-IPRC-Feedback-Interface and RRC shall give constant periodic feedback via an API RRC-IPRC-Feedback-Interface. The periodicity of this feedback is defined as Feedbk_time. The main parameter of the feedback is given below:

Actual ConnUsers: The Scheduler gives that actual number of users that are physically got registered and connected to gNB system during the steady state.

Number_of_cov_dist: The Scheduler gives that actual number of coverage distribution that was measured using the Signal-to-Noise Ratio (SNR) got registered and connected to gNB system during the steady state. Also, RRC gives that average number of coverage distribution that was measured using the Reference Signal Received Power (RSRP)

Users_per_QFI(i): The Scheduler gives that actual number of users across different QFI during the steady state. The index-i can be varied for multiple QFIs supported in the gNB system.

Users_per_Cov_Dist(i): The Scheduler gives that actual number of users across Coverage Distribution during the steady state operation of the gNB system based on SNR. Similarly, the gives that actual number of user distribution per Coverage Distribution during the steady state operation of the gNB system based on RSRP. The index-i can be varied for multiple coverage distribution observed in the gNB system.

Number_of_Signal_Msg(i): The Scheduler gives that actual number of signaling messages observed during the steady state of gNB system. The index-i can be varied for multiple signaling messages supported in the gNB system.

Number_of_Non-Sig_Msg(i): The Scheduler gives that actual number of non-signaling messages observed during the steady state of gNB system. The index-i can be varied for multiple non-signaling messages supported in the gNB system.

Avg_Number_of_msg_per_user_per_service(i): The Scheduler gives that actual number of messages (both signaling or non-signaling) per user observed during the steady state of gNB system. The index-i can be varied for multiple service supported in the gNB system.

PDCCH_Blk_per_CovDist(i)_per_QFI(j)_per_Sig_msg(k)_per_Aggr_Lvl(l): This parameter gives the information that, how many times the scheduler failed to allocate the specific candidate to a user equipment as per the operational parameter defined for specific coverage distribution, QFI, signaling message and Aggregation level.

PDCCH_Blk_per_CovDist(i)_per_QFI(j)_per_Non-Sig_msg(k)_per_Aggr_Lvl(l): This parameter gives the information that, how many times the scheduler failed to allocate the specific candidate to a user equipment as per the operational parameter defined for specific coverage distribution, QFI, signaling message and Aggregation level.

The method (700) may further include at 710 the step of optimizing the IPRC. The IPRC does the parameter value correction using the feedback it got from the Scheduler via the API Sch-IPRC-Feedback-Interface and from RRC via the API RRC-IPRC-Feedback-Interface. The parameters value that get optimized from the default values and different types of instructions listed in the Tables below:

Sig_Aggr_Lvl(i)(j)
Non-sig_Aggr_Lvl(i)(j)
Number_of_PDCCH_candidate_per_CovDist(i)_per_QFI(j)_per_Sig_msg(k)_per_Ag gr_Lvl(l).
Number_of_PDCCH_candidate_per_CovDist(i)_per_QFI(i)_per_Non-Sig_msg(k)_per_Aggr_Lvl(l)

TABLE 6

If PDCCH_Blk_per_CovDist(i)_per_QFI(j)_per_Sig_msg(k)_per_Aggr_Lvl(l)
>PDCCH_Blk_per_CovDist(i)_per_QFI(j)_per_Sig_msg(k)_per_Aggr_Lvl(l)_Th
Using the feedback values of Step-4, IPRC recalculates the
Number_of_PDCCH_candidate_per_CovDist(i)_per_QFI(j)_per_Sig_msg(k)_per_Aggr_Lvl(l)
as given in 706.
Let the value of the new calculation be termed as
New_Number_of_PDCCH_candidate_per_CovDist(i)_per_QFI(j)_per_Sig_msg(k)_per_Aggr_Lvl(l), and
 If
(New_Number_of_PDCCH_candidate_per_CovDist(i)_per_QFI(j)_per_Sig_msg(k)_per_Aggr_Lvl(l)-
Number_of_PDCCH_candidate_per_CovDist(i)_per_QFI(j)_per_Sig_msg(k)_per_Aggr_Lvl(l) ) >HYST
    Keep the newly calculated value and update Scheduler and RRC as per 706
Increase the Sig_Aggr_Lvl(i)(j) by STEP_aggr_Lvltill maximum supported value
  Else
  (Keep the previous value of)
Number_of_PDCCH_candidate_per_CovDist(i)_per_QFI(j)_per_Sig_msg(k)_per_Aggr_Lvl(l) )
Else
    (Keep the previous value)
Number_of_PDCCH_candidate_per_CovDist(i)_per_QFI(j)_per_Sig_msg(k)_per_Aggr_Lvl(l) )
    Decrease the Sig_Aggr_Lvl(i)(j) by STEP_aggr_Lvltill minimum supported value
End If

TABLE 7

If PDCCH_Blk_per_CovDist(i)_per_QFI(j)_per_non-Sig_msg(k)_per_Aggr_Lvl(l)
>PDCCH_Blk_per_CovDist(i)_per_QFI(j)_per_non-Sig_msg(k)_per_Aggr_Lvl(l)_Th
Using the feedback values of Step-4, IPRC recalculates the
Number_of_PDCCH_candidate_per_CovDist(i)_per_QFI(j)_per_Non-Sig_msg(k)_per_Aggr_Lvl(l)
as given in Step-3.
Let the value of the new calculation be termed as
New_Number_of_PDCCH_candidate_per_CovDist(i)_per_QFI(j)_per_Non-Sig_msg(k)_per_Aggr_Lvl(l)
 If
(New_Number_of_PDCCH_candidate_per_CovDist(i)_per_QFI(j)_per_Sig_msg(k)_per_Aggr_Lvl(l)-
Number_of_PDCCH_candidate_per_CovDist(i)_per_QFI(j)_per_Sig_msg(k)_per_Aggr_Lvl(l) ) >HYST
    Keep the newly calculated value and update Scheduler and RRC as per Step-3
    Increase Non-sig_Aggr_Lvl(i)(j) by STEP_aggr_Lvltill maximum supported value

TABLE 7-continued

Else
    (Keep the previous value
Number_of_PDCCH_candidate_per_CovDist(i)_per_QFI(j)_per_Sig_msg(k)_per_Aggr_Lvl(l) )
Else
    (Keep the previous value
Number_of_PDCCH_candidate_per_CovDist(i)_per_QFI(j)_per_Sig_msg(k)_per_Aggr_Lvl(l) )
Decrease Non-sig_Aggr_Lvl(i)(j) by STEP_aggr_Lvltill minimum supported value
End If

---

Figure 8:
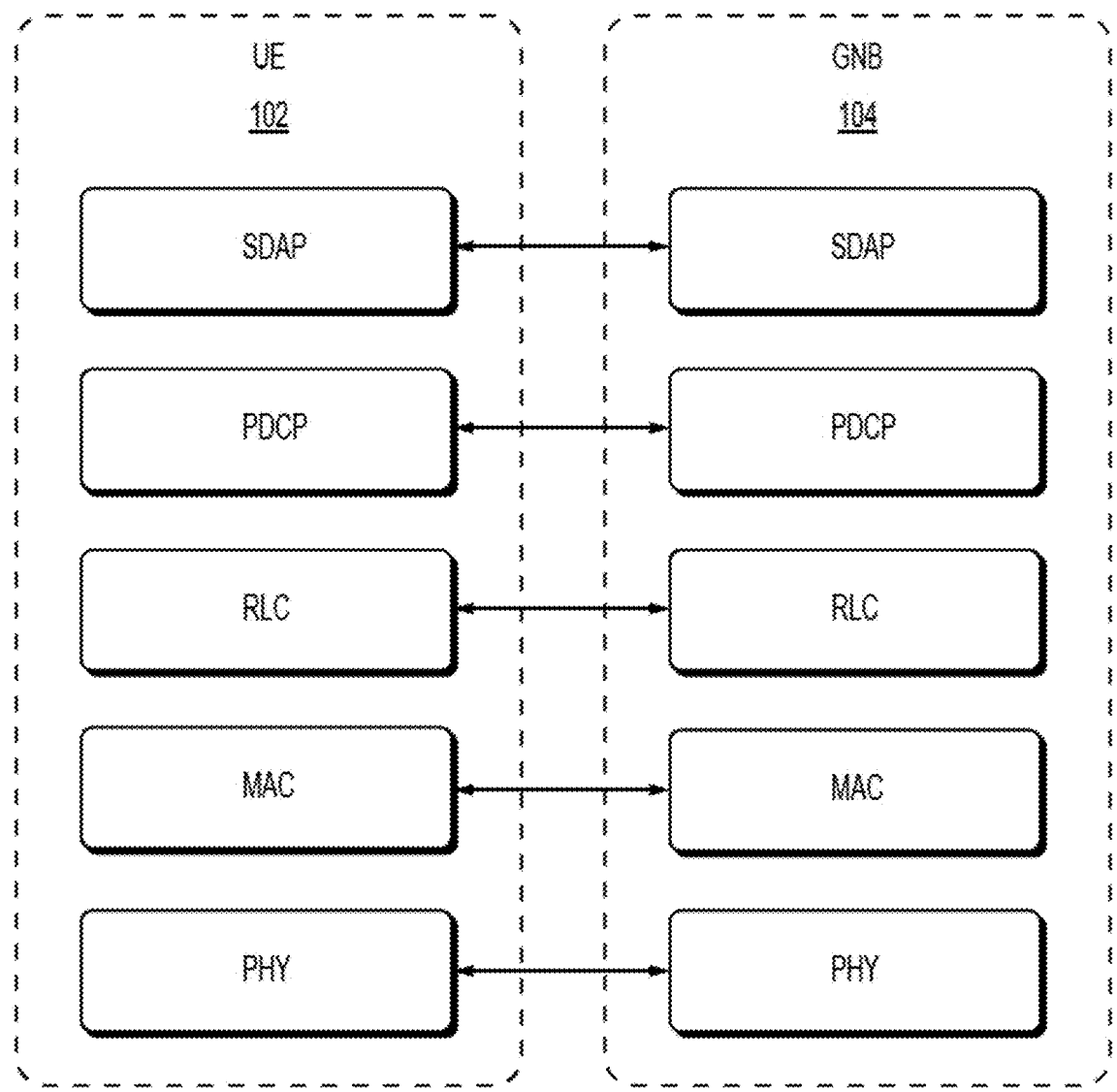
FIG. 8 illustrates an exemplary a User Plane Protocol Stack at User Equipment (UE) and gNB in which or with which embodiments of the present invention can be utilized in accordance with embodiments of the present disclosure.

FIG. 8 illustrates an exemplary a User Plane Protocol Stack at User Equipment (UE) and gNB in which or with which embodiments of the present invention can be utilized in accordance with embodiments of the present disclosure. As illustrated, the protocol stack for the user plane, where SDAP, PDCP, RLC and MAC and PHY sublayers get terminated in gNB on the network side as well as in User equipment (UE) side.

The PHY hosts the following main functions: Physical-layer processing for physical downlink shared channel (PDSCH); Physical-layer processing for Physical downlink control channels (PDCCH); Physical-layer processing for Synchronization signal and PBCH (SSB); Physical-layer processing for physical uplink shared channel (PUSCH); Physical-layer processing for Physical uplink control channel (PUCCH) but not limited to the like.

The MAC hosts the following main functions: Mapping between logical channels and transport channels; Multiplexing/demultiplexing of MAC SDUs belonging to one or different logical channels into/from transport blocks (TB) delivered to/from the physical layer on transport channels; Scheduling information reporting; Error correction through HARQ (one HARQ entity per cell in case of CA); Priority handling between UEs by means of dynamic scheduling; priority handling between logical channels of one UE by means of logical channel prioritisation; Padding but not limited to the like.

The RLC hosts the following main functions: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; Protocol error detection (AM only) but not limited to the like.

The PDCP hosts the following main functions: Sequence Numbering; Header compression and decompression; ROHC only; Transfer of user data; Reordering and duplicate detection; in-order delivery; PDCP PDU routing (in case of split bearers); Retransmission of PDCP SDUs; Ciphering, deciphering and integrity protection; PDCP SDU discard; PDCP re-establishment and data recovery for RLC AM; PDCP status reporting for RLC AM; Duplication of PDCP PDUs (see subclause 16.1.3) and duplicate discard indication to lower layers but not limited to the like.

The SDAP hosts the following main functions: Mapping between a QoS flow and a data radio bearer: Marking QoS flow ID (QFI) in both DL and UL packets but not limited to the like.

The present disclosure provides a method and system for improved PDCCH resource allocation mechanism for high speed wireless communication network that can be configured to:

- Enable default system parameters for candidate calculation: Depending on the geographical deployment area, the gNB system can accept the default system configuration from a user.
- Self-generate operational parameter values for candidate calculation: Dynamically generate operational parameter values for candidate calculation for various aggregation levels based on the gNB system variables and conditions.
- Improve candidate calculation for different aggregation levels: Candidate calculation for different aggregation level using varieties of parameters such as default system parameters and self-generation operational parameters and the like.
- Obtain feedback from the Scheduler and RRC to update the default system parameters: Procedure to get periodic feedback from Scheduler in order to update the default system parameters for efficient number of candidate calculation.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and a method that considers a plurality of system level parameters such as connected users along with estimated user channel condition distribution in order to calculate the PDDCH resources during the start-up of the gNB system wherein the channel conditions directly consider of the slow and fast fading effect.

The present disclosure provides for a system and a method that considers of feedback from a scheduler and an RRC entities to correct the estimated values during the steady state operation of the gNB system.

The present disclosure provides for a system and a method that considers of both the candidates of the common and user specific search spaces.

The present disclosure provides for a system and a method that considers the CCEs calculation and check whether it crosses the maximum value of radio resources. If it shoots up, then method decreases the CCEs to fit into the maximum radio resource limit.

I claim:

1. A system facilitating improved Physical downlink control channels (PDCCH) resource allocation in a wireless network, said system comprising:
one or more user equipment communicatively coupled to the wireless network, said wireless network comprising:
a plurality of base stations, one or more packet gateway nodes;
a scheduler, said scheduler is configured to determine a user traffic data queued in the system;
a radio resource control unit (RRC) operatively coupled to any or a combination of one or more said base stations, said one or more packet gateway nodes and the scheduler, said RRC comprising a processor that executes a set of executable instructions that are stored in a memory, upon which execution, the processor causes the system to:
initialise an improved PDCCH resource calculation (IPRC) unit operatively coupled to the RRC;
upon initialization, receive by the IPRC unit, from the one or more base stations, one or more data packets pertaining to parameters associated with one or more PDCCH resources that require allocation in the wireless network to the one or more user equipment getting registered with the system through the respective packet gateway node;
extract, by the IPRC unit, a first set of attributes pertaining to one or more parameters associated with the one or more PDCCH resources;
extract, by the IPRC unit, a second set of attributes from the scheduler, the second set of attributes pertaining to the user traffic data queued in the system that causes blocking of the one or more PDCCH resources;
calculate, by the IPRC unit, from the extracted first and second set of attributes, a plurality of operation parameters and the one or more PDCCH resources to be allocated; and
update, by the IPRC unit, the number of the one or more PDCCH resources to the RRC and the scheduler.

2. The system as claimed in claim 1, wherein the IPRC unit receives a combination of periodic performance feedback from the scheduler and a constant usage periodic feedback from the RRC to update the IPRC unit, wherein the combination of periodic performance feedback from the scheduler and the constant usage periodic feedback from the RRC correct a plurality of estimated values during a steady state operation of the system.

3. The system as claimed in claim 1, wherein the IPRC unit optimizes the calculation of the one or more PDCCH resources by a set of predefined instructions.

4. The system as claimed in claim 1, wherein during the initialization of the IPRC unit, the IPRC unit interacts with a configuration database coupled to the system through a configuration interface to get default configuration parameters of the system during a start-up of the system.

5. The system as claimed in claim 1, wherein the IPRC unit stores the operational parameters and the default configuration parameters of the system.

6. The system as claimed in claim 1, wherein the IPRC is in a reconfiguration mode, when there is change in the default system configuration parameters, wherein upon change in the default system configuration parameters, the IPRC receives configuration information through a communication interface coupled to the system.

7. The system as claimed in claim 6, wherein the IPRC in the reconfiguration mode is configured to:
take a plurality of latest configuration parameters from the configuration database;
configure the plurality of latest parameters in the IPRC unit; and
store the latest configuration parameters in a local copy in a memory unit coupled to the IPRC unit.

8. The system as claimed in claim 1, wherein if the IPRC is not in the start-up mode or in the re-configuration mode, then the IPRC unit loads a local copy of the configuration parameters of the system into the memory unit.

9. The system as claimed in claim 1, wherein depending on a geographical deployment area, the IPRC unit accepts the default configuration parameters of the system.

10. The system as claimed in claim 1, wherein the IPRC unit dynamically generates the operational parameters for PDCCH resource calculation for a plurality of aggregation levels based on the system variables and conditions.

11. The system as claimed in claim 1, wherein the IPRC unit considers a plurality of system level parameters and estimated user channel condition distribution in order to calculate the PDCCH resources during the start-up of the system.

12. The system as claimed in claim 1, wherein the IPRC unit checks whether a maximum value of the PDCCH resources are crossed, wherein if the maximum value of the PDCCH resources are crossed, then the IPRC unit decreases a Control Channel Element (CCE) to fit into the maximum value of the PDCCH resources.

13. A method facilitating improved Physical downlink control channels (PDCCH) resource allocation in a wireless network, said method comprising:
initialising an improved PDCCH resource calculation (IPRC) unit operatively coupled to a radio resource control unit (RRC) operatively coupled to any or a combination of one or more said base stations, said one or more packet gateway nodes and the scheduler;
upon initialization, receiving by the IPRC unit, from one or more base stations, one or more data packets pertaining to parameters associated with one or more PDCCH resources that require allocation in the wireless network to one or more user equipment getting registered with the system through a respective packet gateway node;
extracting, by the IPRC unit, a first set of attributes pertaining to one or more parameters associated with the one or more PDCCH resources;
extracting, by the IPRC unit, a second set of attributes from the scheduler, the second set of attributes pertaining to the user traffic data queued in the system that causes blocking of the one or more PDCCH resources;
calculating, by the IPRC unit, from the extracted first and second set of attributes, a plurality of operation parameters and the one or more PDCCH resources to be allocated; and
updating, by the IPRC unit, the number of the one or more PDCCH resources to the RRC and the scheduler.

14. The method as claimed in claim 13, wherein the method further comprises:
receiving by the IPRS unit, a combination of periodic performance feedback from the scheduler and a constant usage periodic feedback from the RRC to update the IPRC unit, wherein the combination of periodic performance feedback from the scheduler and the constant usage periodic feedback from the RRC correct a plurality of estimated values during a steady state operation of the system.

15. The method as claimed in claim 13, wherein the method further comprises:
   optimizing, by the IPRC unit, the calculation of the one or more PDCCH resources by a set of predefined instructions.

16. The method as claimed in claim 13, wherein the method further comprises:
   interacting, by the IPRC unit, with a configuration database coupled to the system through a configuration interface to get default configuration parameters of the system during a start-up of the system.

17. The method as claimed in claim 13, wherein the method further comprises:
   storing, by the IPRC unit, the operational parameters and the default configuration parameters of the system.

18. The method as claimed in claim 13, wherein the method further comprises:
   receiving by the IPRC unit, a configuration information through a communication interface coupled to the system upon change in the default system configuration parameters when the IPRC unit is in a reconfiguration mode and there is change in the default system configuration parameters.

19. The method as claimed in claim 18, wherein the method in the reconfiguration mode further comprises:
   taking a plurality of latest configuration parameters from the configuration database;
   configuring the plurality of latest parameters in the IPRC unit; and
   storing the latest configuration parameters in a local copy in a memory unit coupled to the IPRC unit.

20. The method as claimed in claim 13, wherein the method further comprises:
   loading, by the IPRC unit, a local copy of the configuration parameters of the system into the memory unit if the IPRC is not in the start-up mode or in the re-configuration mode.

* * * * *